United States Patent [19]

Williams et al.

[11] Patent Number: 4,930,886
[45] Date of Patent: Jun. 5, 1990

[54] OPAQUE ADAPTER FOR OVERHEAD PROJECTOR

[75] Inventors: Richard E. Williams, Lake Mary; Lewis W. Slimak, Orlando, both of Fla.

[73] Assignee: Numa Corporation, Lake Mary, Fla.

[21] Appl. No.: 281,180

[22] Filed: Dec. 8, 1988

[51] Int. Cl.$^5$ .................. G03B 21/08; G03B 21/28
[52] U.S. Cl. ................. 353/97; 353/DIG. 4; 353/119; 353/66
[58] Field of Search .............. 353/DIG. 4, DIG. 3, 353/65, 66, 67, 75, 119, 97, 52, 55, 56; 312/324

[56] References Cited

U.S. PATENT DOCUMENTS

| | | | |
|---|---|---|---|
| 2,596,393 | 5/1952 | Fitzgerald | 353/97 X |
| 2,598,814 | 6/1952 | McAfee | 312/324 X |
| 2,600,345 | 6/1952 | Venditti | 312/324 X |
| 2,852,980 | 9/1958 | Schroder | 353/55 X |
| 3,376,086 | 4/1968 | Fisher | 312/32 X |
| 3,512,883 | 5/1970 | Noble | 353/97 |
| 3,825,333 | 7/1974 | Dali et al. | 353/75 |

FOREIGN PATENT DOCUMENTS 2230255  1/1975  France ................. 353/97

Primary Examiner—Harry N. Haroian

[57] ABSTRACT

An opaque adapter for an overhead projector uses a hood with clamshell doors to provide generous access to the projector stage during transparency projection and efficient light shielding during opaque projection. The clamshell doors are oriented upon hinges slanted to the vertical so as to rise away from the stage when opened. Spring devices offset the gravitational forces on the doors, allowing rapid motor actuation with very little power. Dual dichroic optics maintain a cool stage despite high light intensity, and internal baffles further increase brightness.

8 Claims, 4 Drawing Sheets

OPAQUE ADAPTER FOR OVERHEAD PROJECTOR

FIELD OF THE INVENTION

This invention relates generally to an opaque adapter for an overhead projector and more specifically to an opaque adapter having a hood with clamshell doors providing substantially unrestricted stage access for transparency projections and essentially complete light enclosure otherwise. Still more specifically, the clamshell doors have hinges slanted relative to vertical to cause them to swing away from the stage when opened. The interiors of the doors are provided with light-reflecting and intercepting baffles to increase the brightness and contrast of a projected opaque image.

The bottoms of the doors have sliding compliancy to allow a small amount of stage access during opaque projection. A pair of springs serve to offset the variable gravitational loading produced by the doors as they are opened, thus reducing the force required. A small d-c motor in a constant-current mode is able to provide the necessary power.

For further light control during projection, a simple light-intercepting baffle prevents stray light from reflecting off of overhead objects and reducing projected image contrast. Reflective fluorescent coatings on the bottoms of the door baffles serve to further increase image brightness by converting ultraviolet radiation from a light source into visible illumination. Dual dichroic optics remove much of the heat produced by the intense light source and maintain low stage temperature.

DESCRIPTION OF THE PRIOR ART

Overhead projectors are widely used in schools, industry, and government applications. Their commercial success stems from the very high quality images that they project, and from the relative ease of stage access and operation. While excellent graphic images of line drawings and lettering are produced, they are less successful in projecting pictorial data because of the difficulty of processing such data in the form of large transparencies.

Pictorial data is often available in the form of excellent four-color printings such as manufacturer's brochures, magazine illustrations, and the like. A striking overall presentation can result from interleaving the latter with overhead transparencies containing graphics. Graphics presentations often require open stage access so that the presenter can write upon, or point to, various elements during projection. A composite presentation thus requires open stage accessibility during transparency projection, substantially complete stage enclosure during opaque projection, and a very facile method of quickly alternating between the two.

Prior art has not been commercially successful because of its inability to provide such features. Although opaque adapters for overhead projectors have been described for many years, none has truly solved the opaque-to-transparency interleaving problem. Market surveys have shown that for user acceptance, almost unlimited access to the stage is mandatory for transparency use, and rapid conversion to an opaque mode is equally demanded. Prior art in general tends to ignore these requirements. In cases where some provision is made, either an entire assembly has to be removed or access is limited.

OBJECTS OF THE INVENTION

Accordingly, it is an object of this invention to provide a novel opaque adapter for an overhead projector in which a clamshell configuration provides open stage access for transparency operation, and provides an efficient light enclosure for opaque operation.

Another object is to provide clamshell doors pivoted so as to move away from the stage when opened.

Still another object is to provide a unique door spring arrangement to offset a varying gravitational load as the doors are opened.

Yet another object is to provide the doors with internal baffles to process reflected light so as to increase image contrast.

Still another object is to provide an overhead baffle plate to intercept stray light that would impair image contrast.

Yet another object is to provide a dual dichroic optical arrangement to reduce stage heating under intense light conditions.

Still another object is to provide a low power constant-current motor circuit to actuate the doors.

These and other objects of the invention will become apparent from the following description when taken in conjunction with the accompanying drawings wherein.

DETAILED DESCRIPTION OF THE INVENTION STAGE ACCESS

Figure 2:
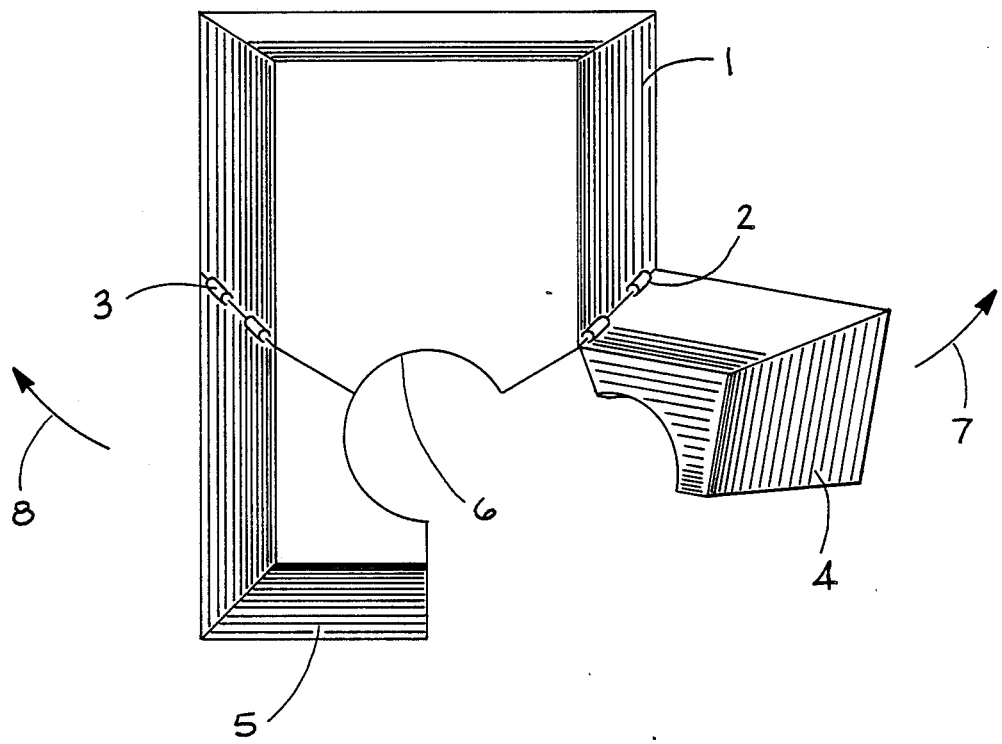
FIG. 2 is a top view of the invention showing the clamshell door arrangement.

Turning now more specifically to the drawings, FIG. 2 is a top view of the opaque adapter with its front to the bottom of the Figure. A hood 1 has a pair of hinges 2, 3 that support a pair of clamshell doors 4, 5. "Clamshell" is defined in this invention as 'in the shape of a hinged jaw'. When closed, the hood and doors create a light-intercepting enclosure over the stage of an overhead projector upon which the adapter is positioned. An aperture 6 is located directly below the lens assembly of the overhead projector. The doors 4, 5 can be controllably opened in the directions of arrows 7, 8 when transparency projection is desired, providing excellent stage access to the user at the front of the projector.

Although in FIG. 2 door 5 is shown closed and door 4 is open for clarity, in normal operation the doors are opened and closed essentially simultaneously. The mechanism to operate them is described later in reference to FIG. 4.

Figure 1:
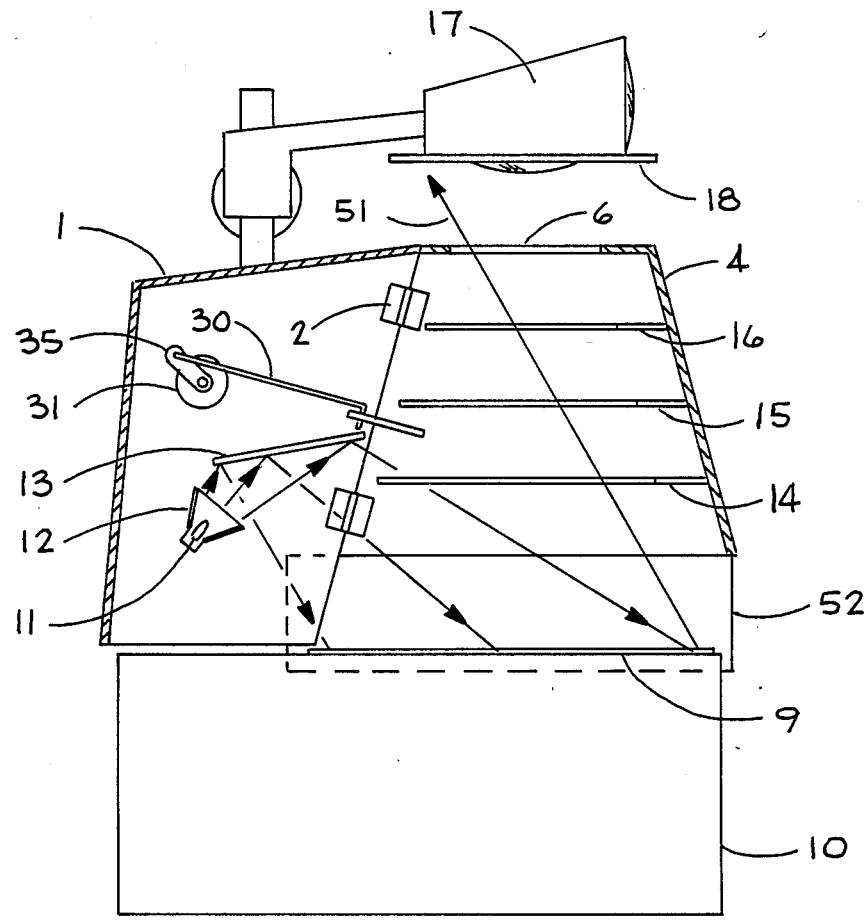
FIG. 1 is a side cross-sectional view of the invention showing the clamshell door hinges, door baffle plates, overhead baffle plate, and dual-dichroic optical arrangement.

Referring now to FIG. 1 which is a side cross-sectional view of the adapter positioned over an overhead projector, hinge 2 is seen to be slanted with respect to vertical. When door 4 is opened it moves away and upward from stage 9 which is part of the overhead projector 10. It is seen that the stage access is generous when the doors 4, 5 are opened . . . normally during transparency operation. A resilient skirt 52 attached to each door intercepts light that could otherwise leak out around stage 9.

During opaque projection when the doors are closed, all light except for that exiting the hood through top aperture 6 is intercepted by the clamshell structure. This is extremely important since typical opaque pictorial information has a wide intensity range that can be easily be washed out by stray light hitting the projection screen. The doors 4 and 5 overlap slightly when closed, as shown by seam 50 in FIG. 4, to assure that no light leakage occurs in the direction of the screen.

INTERNAL LIGHT CONTROL

The light source for opaque illumination 11 of FIG. 1 is connected via a door switch, not shown, to extinguish whenever the clamshell doors are open. Similarly, the overhead projector light source can be connected to activate at that time. By such means, the interleaving of opaque and transparency modes is rendered rapid and convenient for the user.

Commercially-available light source 11 is provided with a dichroic reflector 12 which selectively reflects visible light but transmits longer wavelengths that produce heat. In effect, the lamp becomes an isotropic heat radiator, but a directive visible light radiator. Even so, if the lamp is allowed to directly illuminate stage 9 which typically contains a plastic fresnel lens, enough heat can be intercepted by the stage to cause stage distortion.

The present invention does not direct source 11 at stage 9, but instead employs a dichroic mirror 13 to indirectly reflect the light onto the stage. Mirror 13 reflects visible light but transmits longer wavelengths as was the case with lamp reflector 12. Accordingly, a dual dichroic process results. Since the composite dichroic ratio is the product of the individual ratios, a very substantial heat reduction is realized at the stage surface.

A series of baffles 14, 15, 16 are provided on the interior of door 4. The baffles are substantially parallel to the stage surface 9, but when the doors are closed they do not extend into the interior far enough to interfere with light rays going directly from stage 9 to lens assembly 17. The bottoms of the baffles are reflective and preferably fluorescent. Light source 11, which is typically a halogen lamp, is rich in radiation in the near ultraviolet, approximately 350 nanometers. The high energy available in that spectral region is normally wasted because it is not visible. It can, however, be efficiently converted into visible fluorescence. Baffles 14, 15, and 16 intercept stray light and, by means of reflection and fluorescence retu much visible radiation the stage and increase image brightness. The baffles, by returning stray rays downward, also eliminate oblique upward rays that tend to reduce contrast.

For focusing, lens assembly 17, which is part of the overhead projector, is adjusted vertically. In order to accommodate the larger angle subtended within the hood by a lowered assembly 17, baffles 14, 15, 16 must be constructed slightly shorter than the optimum value for a raised assembly 17. Accordingly, some scattered light can miss the assembly at the higher location as indicated by ray 51. That light in some cases can be reflected from a light colored ceiling, etc., to cause reduced image contrast on a projection screen. A light-intercepting baffle plate 18 of the invention attaches to the assembly 17 via Velcro or a similar detachable fastener to prevent such deleterious reflections.

DOOR MOTION CONTROL

Figure 3:
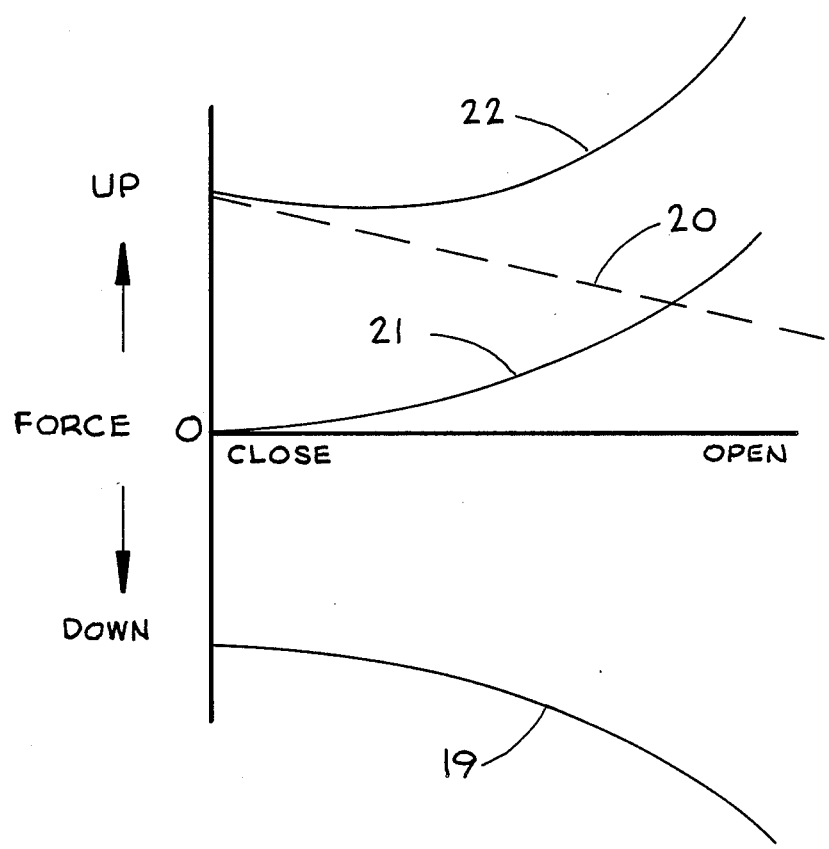
FIG. 3 is a graph of the gravitational and spring forces as functions of door motion.

Returning to FIGS. 1 and 2, it will be noted that due to the door masses and slanted hinges, gravitational force will tend to close the doors, with maximum force being encountered when the doors are fully open. FIG. 3 provides a graph 19 expressing that force as a function of door positions. The force is seen to to be less as the doors are closed.

In order to accurately balance out the gravitational force it is desirable to create a corresponding force in the opposite direction for all degrees of closure. Unfortunately, compensation provided by a simple spring located within the hood will always tend to weaken as the doors open; i. e., the slope of the function is in the wrong direction. In the present invention this problem is handled in two steps. First, a spring having a relatively low displacement (low stretch in proportion to its length) is used to produce a reasonably constant opposition force as shown by dashed line 20 in FIG. 3. This tends to bring the net force close to zero when the doors are closed. It is then possible to use a slope-compensating lateral spring to produce force 21. The resultant of the forces from the two springs is shown as force 22 which is seen to accurately cancel the gravitational force 19.

Figure 4:
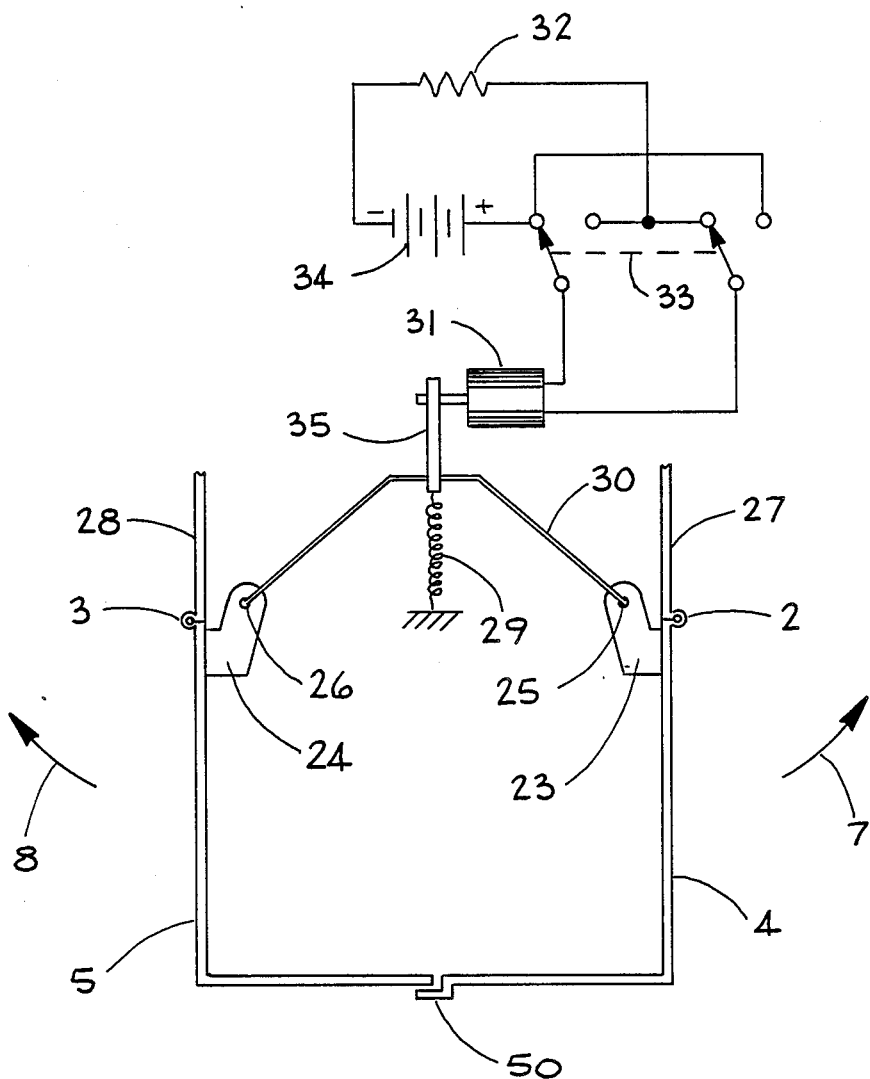
FIG. 4 is an overhead sectional view of a dual-spring arrangement to provide the functions of FIG. 3.

The actual spring arrangement is shown in FIG. 4. Bell cranks 23 and 24 are fastened to doors 4 and 5 so as to provide pivot points 25 and 26. The points are located close to hinges 2 and 3 so that small arcs are transcribed by the points as the doors are opened. The points will move almost parallel to hood walls 27 and 28 and thus long tension spring 29 will exert a fairly constant opening force on the doors at all times. That is the force 20 of FIG. 3.

The U-shaped spring 30 of FIG. 4, on the other hand, is preshaped to provide a lateral or outward-going force vector upon the pivot points 25, 26. Since a locus connecting the pivot points to the hinges is nearly congruent to the spring force vector when the doors are closed, spring 30 has little effect when the doors are nearly closed.

As the doors are opened, however, pivot points 25, 26 move past the hinges 2, 3 in a downward direction in FIG. 4, and the lateral spring outward force vectors are converted to rotary torques by bell cranks 23, 24. The torques tend to open the doors and become maximum as the doors approach their maximally open states. The force curve thus matches 21 of FIG. 3. The total resultant of all factors is always close to zero, and the doors will remain in any position with negligible effort.

Since only inertial forces need be overcome by a door actuator, an extremely low torque device can be employed. A low power d-c motor 31 of FIG. 4 is connected via an impedance 32 and a polarity-reversing switch 33 to a d-c voltage source 34. The motor rotates a lever arm 35 to provide the modest force required to change door positions. Through use of a constant-current connection provided by impedance 32, the motor can be left in a stalled state at limits of door excursion without excessive dissipation. The power requirements are so low that losses in impedance 32 are negligible. When the polarity is reversed by switch 33 the motor will reverse rotation and thus door motion.

Although a motorized embodiment is shown in the Figure, it is evident that the doors could be manually moved with similar results. In the latter case it is desirable to shift the pivot points 25, 26 slightly upward in the Figure relative to hinges 2, 3 so that the lateral spring 30 will supply a slight closing torque in the closed position. This provides toggle action which causes the doors to tend to remain at the open or closed limits.

While the invention has been particularly shown and described with reference to preferred embodiments thereof, it will be understood by those skilled in the arts that various changes in form and details may be made therein without departing from the spirit and scope of the invention.

What is claimed as new and desired to be protected by Letters Patent is set forth in the appended claims.

We claim:

1. A device to provide opaque projection in an overhead projector having a stage, comprising:
    a light-intercepting hood positioned over said stage;
    a pair of controllable clamshell doors affixed to said hood by pivotal means slanted relative to vertical so as to cause said doors to move up and away from said stage when said doors are opened; and 2. A device to provide projection in an overhead projector having a stage, comprising:
    a projection lens positioned substantially directly above said stage and outside of a light-intercepting hood;
    an aperture in said hood to allow light rays from said stage to reach said lens;
    a pair of controllable clamshell doors affixed to said hood by pivotal means whereby said doors when closed encompass said light rays and when opened provide access to said stage;
    a light source located within said hood to illuminate said stage; and
    a light-intercepting baffle attached to said lens to intercept light rays emanating through said aperture and missing said lens when said doors are closed.

3. A device to provide opaque projection in an overhead projector having a stage, comprising:
    a light-intercepting hood positioned over said stage;
    a pair of controllable clamshell doors affixed to said hood by pivotal means whereby said doors provide access to said stage and wherein the internal surfaces of said doors are provided with light-reflecting baffles substantially parallel to said stage when said doors are closed; and
    a light source located within said hood to illuminate said stage.

4. The device as set forth in claim 3 in which said doors are attached to spring means which provide forces substantially offsetting gravitational forces upon said doors.

5. The device as set forth in claim 4 in which said spring means comprise a substantially constant force spring and a spring whose force increases as said doors are opened.

6. The device as set forth in claim 4 in which said doors are controllably opened or closed by motor means.

7. The device as set forth in claim 6 in which said motor is operated in a constant current mode.

8. The device as set forth in claim 3, further comprising:
    an ultraviolet radiation component stemming from said light source; and
    a fluorescent lower surface on at least one of said light-reflecting baffles.

* * * * *